United States Patent
Kono et al.

(10) Patent No.: US 9,639,160 B2
(45) Date of Patent: May 2, 2017

(54) TACTILE SENSATION PROVIDING DEVICE

(71) Applicant: KYOCERA CORPORATION, Kyoto (JP)

(72) Inventors: Kenji Kono, Yokohama (JP); Jun Takeda, Yokohama (JP); Kouta Iyoda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/770,745

(22) PCT Filed: Feb. 25, 2014

(86) PCT No.: PCT/JP2014/000986
§ 371 (c)(1),
(2) Date: Aug. 26, 2015

(87) PCT Pub. No.: WO2014/132629
PCT Pub. Date: Sep. 4, 2014

(65) Prior Publication Data
US 2016/0004312 A1    Jan. 7, 2016

(30) Foreign Application Priority Data

Feb. 26, 2013    (JP) .................................. 2013-036311

(51) Int. Cl.
*H04B 3/36*    (2006.01)
*G06F 3/01*    (2006.01)
*G06F 1/16*    (2006.01)

(52) U.S. Cl.
CPC ............ *G06F 3/016* (2013.01); *G06F 1/1626* (2013.01); *G06F 1/1656* (2013.01)

(58) Field of Classification Search
CPC ...... G06F 1/1656; G06F 3/016; G06F 1/1626; A63F 13/285
(Continued)

(56) References Cited

U.S. PATENT DOCUMENTS 7,664,278 B2    2/2010  Watanabe et al.
2006/0109254 A1    5/2006  Akieda et al.
(Continued)

FOREIGN PATENT DOCUMENTS

JP    2006-146611 A    6/2006
JP    2006-174004 A    6/2006
(Continued)

OTHER PUBLICATIONS

An Office Action; "Notice of Reasons for Rejection," issued by the Japanese Patent Office on Sep. 8, 2015, which corresponds to Japanese Patent Application No. 2015-502774 and is related to U.S. Appl. No. 14/770,745; with English language concise explanation.
(Continued)

*Primary Examiner* — John A Tweel, Jr.
(74) *Attorney, Agent, or Firm* — Studebaker & Brackett PC

(57) ABSTRACT

A tactile sensation providing device can provide a user with an appropriate tactile sensation by efficiently vibrating a panel and is waterproof or dustproof. The tactile sensation providing device includes a panel; a tactile sensation provider, which provides a tactile sensation by vibrating the panel; a housing; and silicon rubber with a general U-shaped cross-section, disposed between the panel and the housing, for suppressing intrusion of dust or water from outside the housing to inside the housing.

3 Claims, 2 Drawing Sheets

(58) Field of Classification Search
USPC .................................. 340/407.1; 345/173
See application file for complete search history.

(56) References Cited

U.S. PATENT DOCUMENTS

| | | | |
|---|---|---|---|
| 2006/0140437 A1 | 6/2006 | Watanabe et al. | |
| 2006/0181522 A1 | 8/2006 | Nishimura et al. | |
| 2011/0260991 A1 | 10/2011 | Aono | |
| 2013/0328820 A1* | 12/2013 | Kondoh | G06F 1/1656 345/173 |
| 2016/0004312 A1* | 1/2016 | Kono | G06F 1/1656 340/407.1 |

FOREIGN PATENT DOCUMENTS

| | | |
|---|---|---|
| JP | 2006-215776 A | 8/2006 |
| JP | 2008-186188 A | 8/2008 |
| JP | 2011-034150 A | 2/2011 |
| JP | 2012-174103 A | 9/2012 |
| WO | 2012/114761 A1 | 8/2012 |
| WO | 2012/137443 A1 | 10/2012 |

OTHER PUBLICATIONS

An Office Action; "Decision for Rejection," issued by the Japanese Patent Office on Feb. 9, 2016, which corresponds to Japanese Patent Application No. 2015-502774 and is related to U.S. Appl. No. 14/770,745; with English language concise explanation.

International Search Report; PCT/JP2014/000986; May 13, 2014.

Written Opinion of the International Searching Authority with concise explanation; PCT/JP2014/000986; May 13, 2014.

The extended European search report issued by the European Patent Office on Sep. 7, 2016, which corresponds to European Patent Application No. 14757280.4-1959 and is related to U.S. Appl. No. 14/770,745.

* cited by examiner

TACTILE SENSATION PROVIDING DEVICE

CROSS-REFERENCE TO RELATED APPLICATIONS

This application claims priority to and the benefit of Japanese Patent Application No. 2013-036311 filed Feb. 26, 2013, the entire contents of which are incorporated herein by reference.

TECHNICAL FIELD

This disclosure relates to a tactile sensation providing device for providing a tactile sensation via vibration.

BACKGROUND

In recent years, a tactile sensation providing device that provides a tactile sensation via vibration in response to user operation is increasingly being installed in a variety of devices for consumer use, including mobile information devices such as smartphones and tablet PCs and household appliances such as microwave ovens, televisions, or lighting appliances, as well as a variety of industrial devices (factory automation equipment) including automatic teller machines (ATMs), ticket vending machines, automatic vending machines, and the like (for example, see PTL 1).

CITATION LIST

Patent Literature

PTL 1: JP 2011-34150 A

For example from the perspective of reduced energy consumption, there is a desire for the above-described tactile sensation providing device to provide an appropriate tactile sensation by efficiently vibrating the panel contacted by the user. There is also a desire for the above-described tactile sensation providing device to be waterproof or dustproof.

It could therefore be helpful to provide a tactile sensation providing device that can provide a user with an appropriate tactile sensation by efficiently vibrating a panel and that is waterproof or dustproof.

SUMMARY

We provide a tactile sensation providing device including: a panel; a tactile sensation provider configured to provide a tactile sensation by vibrating the panel; a housing; and silicon rubber with a general U-shaped cross-section, attached between the panel and the housing, for suppressing intrusion of dust or water from outside the housing to inside the housing.

It is thus possible to provide a tactile sensation providing device that can provide a user with an appropriate tactile sensation by efficiently vibrating a panel and that is waterproof or dustproof.

DETAILED DESCRIPTION

The following describes embodiments with reference to the drawings.

Figure 1:
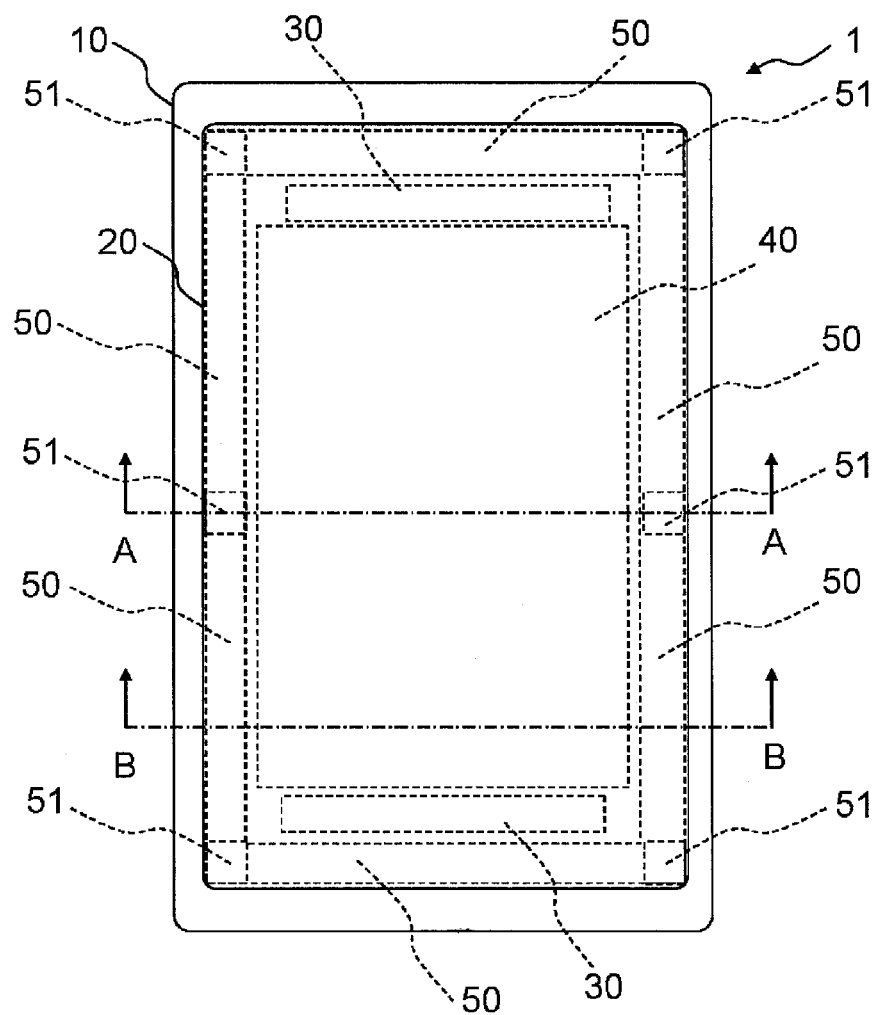
FIG. 1 is a front view of a tactile sensation providing device 1 according to Embodiment 1.
Figure 2:
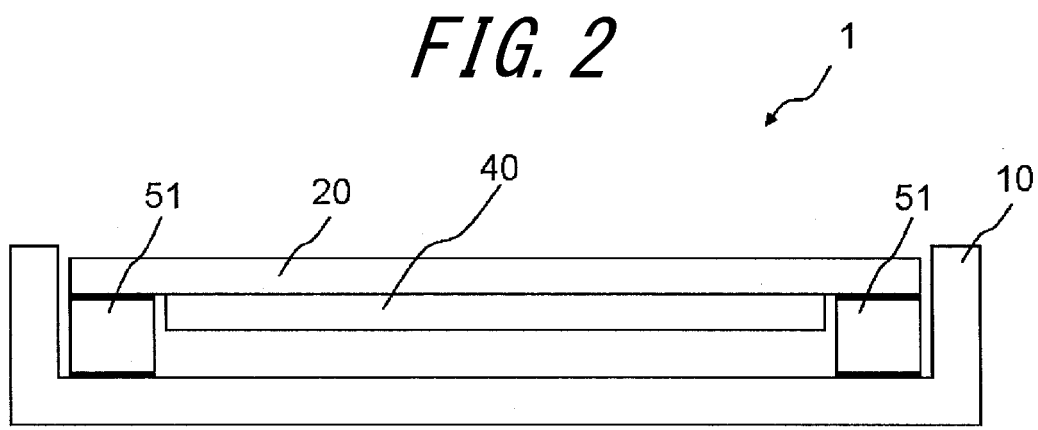
FIG. 2 is a cross-sectional view along the A-A line in FIG. 1 of the tactile sensation providing device 1 according to Embodiment 1.
Figure 3:
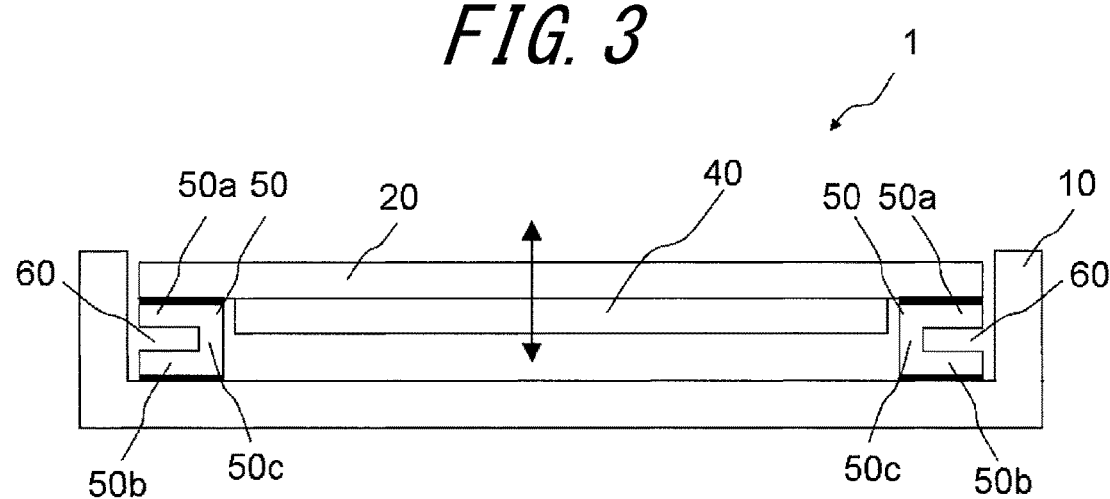
FIG. 3 is a cross-sectional view along the B-B line in FIG. 1 of the tactile sensation providing device 1 according to Embodiment 1.

FIG. 1 is a front view of a tactile sensation providing device 1 according to Embodiment 1. FIG. 2 is a cross-sectional view along the A-A line of the tactile sensation providing device 1 according to Embodiment 1. FIG. 3 is a cross-sectional view along the B-B line of the tactile sensation providing device 1 according to Embodiment 1. As viewed from the outside, the tactile sensation providing device 1 according to the present embodiment includes a housing 10 and a panel 20. As illustrated in FIG. 1, the components provided inside the tactile sensation providing device 1 are illustrated by dashed lines. On the inside, the tactile sensation providing device 1 includes a tactile sensation provider 30, a display 40, and silicon rubber 50 and 51.

The housing 10 may, for example, be made of metal, plastic, resin, or the like and is rectangular in plan view. In the present description, the term rectangular also includes the case of arc-shaped corners. The housing 10 may be configured using one housing or using an integral combination of an upper housing and a lower housing. When using an integral combination of an upper housing and a lower housing, appropriate dustproofing or waterproofing measures are taken between the upper housing and the lower housing, for example by adopting a sealed structure with rubber packing between the housings.

The panel 20 is operated by the user's finger, a stylus pen, or the like and may be configured using plastic, glass (LCD glass), or the like that has a thickness allowing for minute displacement by flexing (for example, several dozen micrometers). The panel 20 may, for example, be configured using a touch panel with a resistive film type, capacitive type, optical type, or other such standard contact detection function. In the illustrated example, the panel 20 is rectangular in plan view, yet the panel 20 may instead be square.

Two piezoelectric elements (tactile sensation provider) 30 for causing the panel 20 to undergo flexure vibration are disposed on the panel 20, on the back face of the panel at the opposite side of the tactile sensation providing face (operating face), which is the face that is operated by the user's finger, a stylus pen, or the like. Each piezoelectric element 30 is monomorph, bimorph, unimorph, or the like, has the same elongated rectangular shape, and flexes or expands and contracts in the longitudinal direction due to application of voltage. One of the piezoelectric elements 30 is adhesively fixed to the back face of the panel at one of the two opposing short sides of the back face of the panel, so that the longitudinal direction of the piezoelectric element 30 extends along the short side. Similarly, the other one of the piezoelectric elements 30 is adhesively fixed to the back face of the panel at the other short side of the back face of the panel, so that the longitudinal direction of the piezoelectric element 30 extends along the short side.

The display 40 is configured using a display device such as a liquid crystal display (LCD display), an organic EL panel, an inorganic EL panel, or the like. The display 40 may display characters as well as images of graphics and the like. The display 40 is adhesively fixed to the back face of the panel.

The silicon rubber 50 and 51 is dustproof or waterproof and is attached (adhered) to the back face of the panel 20 and the bottom of the housing 10 by double-sided tape, bond (adhesive), or the like. The double-sided tape or bond that attaches the silicon rubber 50, 51 to the panel 20 has a width sufficient for water not to intrude between the silicon rubber 50, 51 and the panel 20. The same holds for the double-sided tape or bond that attaches silicon rubber 50, 51 to the housing 10.

As illustrated in FIGS. 2 and 3, the cross-sectional shapes of the silicon rubber 50 and the silicon rubber 51 differ. Nevertheless, the silicon rubber 50 and silicon rubber 51 are formed by being molded integrally, so that the silicon rubber 50 and silicon rubber 51 are integral and continuous. As illustrated in FIG. 1, the silicon rubber 50 and 51 are formed in a frame shape and are adhered by double-sided tape, adhesive, or the like along the periphery of the back face of the panel 20.

As illustrated in FIGS. 1 and 2, the panel 20 is supported at the bottom of the housing 10 by six pieces of the silicon rubber 51. Accordingly, in the illustrated example, between the back face of the panel 20 and the bottom of the housing 10, a space is formed in the housing 10 by the six pieces of silicon rubber 51. A battery, a circuit board containing components such as the drive circuit of the piezoelectric element 30, and the like are provided in this space.

As illustrated in FIG. 3, the silicon rubber 50 has a general U-shape in a B-B cross-section. In the present disclosure, the portion of the silicon rubber 50 attached to the panel 20 by double-sided tape or the like is referred to as a panel attaching portion 50a, the portion attached to the housing 10 by double-sided tape or the like is referred to as a housing attaching portion 50b, and the portion connecting the panel attaching portion 50a and the housing attaching portion 50b is referred to as a connector 50c.

As illustrated in FIG. 3, in the silicon rubber 50 according to Embodiment 1, the end of the panel attaching portion 50a towards the housing center and the end of the housing attaching portion 50b towards the housing center are connected by the connector 50c, which is generally linear. A space 60 containing no silicon rubber 50 is formed between the panel attaching portion 50a and the housing attaching portion 50b.

As illustrated in FIGS. 2 and 3, the silicon rubber 50 and 51 that are dustproof or waterproof (that suppress intrusion of dust or water) are disposed (attached) between the housing 10 and the panel 20. The silicon rubber 50 and 51 are attached to the housing 10 and the panel 20 by double-sided tape or the like so that water does not intrude. Therefore, the tactile sensation providing device 1 can suppress intrusion of water or dust from outside the housing to inside the housing (into the space between the back face of the panel 20 and the bottom of the housing 10).

The tactile sensation providing device 1 according to the present embodiment detects operation on the panel 20 and drives the piezoelectric element 30. The panel 20 is thus caused to undergo flexure vibration in the directions indicated by the arrows in FIG. 3, providing a tactile sensation to the user of the panel 20. When the panel 20 includes a contact detection function, this operation on the panel 20 may be detected by the contact detection function. Furthermore, pressure due to the contact on the panel 20 may be detected in order to detect the operation on the panel 20. In this case, pressure on the panel 20 may be detected using the piezoelectric element 30 or may be detected by providing a separate piezoelectric element for pressure detection, a strain sensor, or the like.

In the tactile sensation providing device 1 according to the present embodiment, the silicon rubber 50 and 51 attached to the periphery of the back face of the panel 20 thus constricts and expands in accordance with flexure vibration of the panel 20. The cross-section of the silicon rubber 50 according to the present embodiment is a general U-shape and includes the space 60 between the panel attaching portion 50a and the housing attaching portion 50b, thereby facilitating constriction and expansion of the silicon rubber 50. Accordingly, the tactile sensation providing device 1 can more efficiently cause the panel 20 to undergo flexure vibration due to the piezoelectric elements 30.

Figure 4:
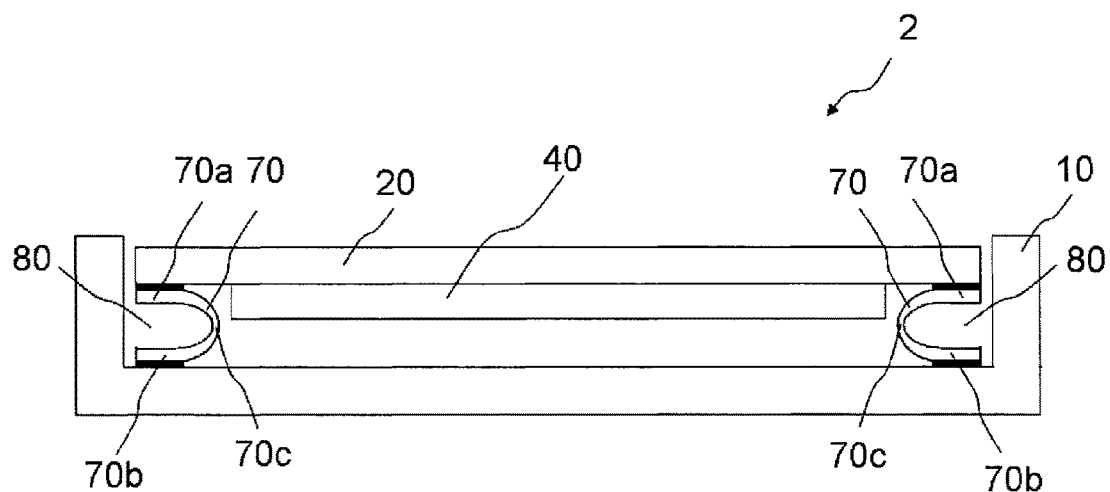
FIG. 4 is a cross-sectional view along the B-B line in FIG. 1 of a tactile sensation providing device 2 according to Embodiment 2.

FIG. 4 is a cross-sectional view along the B-B line in FIG. 1 of a tactile sensation providing device 2 according to Embodiment 2. The front view of the tactile sensation providing device 2 according to Embodiment 2 is the same as FIG. 1 and is therefore omitted. Furthermore, the cross-sectional view along the A-A line in FIG. 1 of the tactile sensation providing device 2 according to Embodiment 2 is the same as FIG. 2 and is therefore omitted. In the tactile sensation providing device 2 according to Embodiment 2, structural components that are the same as in the tactile sensation providing device 1 according to Embodiment 1 are labeled with the same reference signs, and a description thereof is omitted. In the tactile sensation providing device 2 according to Embodiment 2, the silicon rubber 50 according to Embodiment 1 is changed to silicon rubber 70.

As illustrated in FIG. 4, in the tactile sensation providing device 2 according to Embodiment 2, the shape of the silicon rubber 70 differs from that of the silicon rubber 50 according to Embodiment 1.

As illustrated in FIG. 4, the silicon rubber 70 of the tactile sensation providing device 2 according to Embodiment 2 has a general U-shape in a B-B cross-section. In the present disclosure, the portion of the silicon rubber 70 attached to the panel 20 by double-sided tape or the like is referred to as a panel attaching portion 70a, the portion attached to the housing 10 by double-sided tape or the like is referred to as a housing attaching portion 70b, and the portion connecting the panel attaching portion 70a and the housing attaching portion 70b is referred to as a connector 70c.

As illustrated in FIG. 4, in the silicon rubber 70 according to Embodiment 2, the end of the panel attaching portion 70a towards the housing center and the end of the housing attaching portion 70b towards the housing center are connected by the connector 70c which has an arc shape projecting towards the housing center. A space 80 containing no silicon rubber 70 is formed between the panel attaching portion 70a and the housing attaching portion 70b.

The silicon rubber 70 of the tactile sensation providing device 2 according to the present embodiment has a general U-shaped cross-section, like the silicon rubber 50 of the tactile sensation providing device 1 according to Embodiment 1, yet as compared to the silicon rubber 50, this cross-section is closer to the shape of a curved letter U. The silicon rubber 50 of the tactile sensation providing device 1 according to Embodiment 1 also has a general U-shaped cross-section, yet as compared to the silicon rubber 70, this cross-section is a more square-like letter U.

As compared to the connector 50c of the silicon rubber 50, the connector 70c of the silicon rubber 70 is curved and therefore is longer.

Furthermore, due to being bent, the silicon rubber 70 can constrict and expand more easily than the silicon rubber 50.

Accordingly, the tactile sensation providing device 2 according to Embodiment 2 can cause the panel 20 to undergo flexure vibration due to the piezoelectric elements 30 more efficiently than the tactile sensation providing device 1 according to Embodiment 1.

The inventors performed an experiment to measure vibration of the panel 20 by applying the same voltage to the piezoelectric elements 30 of the tactile sensation providing device 1 according to Embodiment 1 and the tactile sensation providing device 2 according to Embodiment 2. The experiment results revealed that the panel 20 vibrated 1.5 to 2.5 times more in the tactile sensation providing device 2 according to Embodiment 2. In this experiment to measure vibration of the panel 20, the silicon rubber 50 and silicon rubber 70 were formed to the same thickness, and the attaching width of the double-sided tape for attaching (adhering) the silicon rubber to the housing 10 and the panel 20 was the same for the silicon rubber 50 and the silicon rubber 70.

The disclosure is not limited to the above embodiments, and it is to be noted that various changes and modifications based on the disclosure will be apparent to those skilled in the art. Therefore, such changes and modifications are to be understood as included within the scope of the disclosure. For example, the panel 20 is not limited to including two piezoelectric elements 30, and a configuration to vibrate the panel 20 with one or with three or more piezoelectric elements may be adopted. The panel 20 is not limited to flexure vibration, and the surface may vibrate in parallel to the normal direction. Furthermore, the vibration source of the panel 20 is not limited to a piezoelectric element and may instead be an eccentric motor, an actuator, or the like.

REFERENCE SIGNS LIST

1: Tactile sensation providing device
10: Housing
20: Panel
30: Piezoelectric element
40: Display
50, 51: Silicon rubber
50a: Panel attaching portion
50b: Housing attaching portion
50c: Connector
60: Space
70, 71: Silicon rubber
70a: Panel attaching portion
70b: Housing attaching portion
70c: Connector
80: Space

The invention claimed is:

1. A tactile sensation providing device comprising:
a panel;
a tactile sensation provider configured to provide a tactile sensation by vibrating the panel;
a housing; and
silicon rubber with a general U-shaped cross-section, attached between the panel and the housing, for suppressing intrusion of dust or water from outside the housing to inside the housing, wherein
a space between arms of the silicon rubber faces laterally towards external sides of the housing.

2. A tactile sensation providing device comprising:
a panel;
a tactile sensation provider configured to provide a tactile sensation by vibrating the panel;
a housing; and
silicon rubber with a general U-shaped cross-section, attached between the panel and the housing, for suppressing intrusion of dust or water from outside the housing to inside the housing, wherein
a direction of vibration of the panel is orthogonal to a bilateral centerline of a cross-section of the silicon rubber.

3. A tactile sensation providing device comprising:
a panel;
a tactile sensation provider configured to provide a tactile sensation by vibrating the panel;
a housing; and
silicon rubber with a general U-shaped cross-section, attached between the panel and the housing, for suppressing intrusion of dust or water from outside the housing to inside the housing, wherein
the silicon rubber comprises:
a panel attaching portion attached to the panel,
a housing attaching portion attached to an inner surface of the housing facing the panel, and
a connector connecting the panel attaching portion and the housing attaching portion, and
a space containing no silicon rubber is formed between the panel attaching portion and the housing attaching portion.

* * * * *